(12) United States Patent
Park et al.

(10) Patent No.: US 10,630,970 B2
(45) Date of Patent: Apr. 21, 2020

(54) SYSTEM AND METHOD FOR DETERMINING SATELLITE IMAGE LOSS AND COMPUTER-READABLE RECORDING MEDIUM THEREFOR

(71) Applicant: KOREA AEROSPACE RESEARCH INSTITUTE, Daejeon (KR)

(72) Inventors: Jin Hyung Park, Daejeon (KR); Hyun Su Lim, Daejeon (KR); Dae Won Chung, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 240 days.

(21) Appl. No.: 15/794,900

(22) Filed: Oct. 26, 2017

(65) Prior Publication Data
US 2018/0124388 A1  May 3, 2018

(30) Foreign Application Priority Data

Nov. 1, 2016 (KR) ........................ 10-2016-0144474

(51) Int. Cl.
*H04N 17/00* (2006.01)
*B64G 1/00* (2006.01)
(Continued)

(52) U.S. Cl.
CPC ............. *H04N 17/002* (2013.01); *B64G 1/00* (2013.01); *G06T 3/4007* (2013.01); *H04B 7/185* (2013.01)

(58) Field of Classification Search
CPC ........ B64G 1/00; G06T 3/4007; H04B 7/185; H04N 17/002
(Continued)

(56) References Cited

U.S. PATENT DOCUMENTS 6,336,062 B1 * 1/2002 Yamashita ............. B64G 1/365
244/171
2007/0076943 A1 * 4/2007 Wienecke ........ G01N 21/95607
382/145
(Continued)

FOREIGN PATENT DOCUMENTS

JP  2000-142594 A  5/2000
JP  2001-165694 A  6/2001
(Continued)

OTHER PUBLICATIONS

Nishihama et al. (MODIS Level 1A Earth Location: Algorithm Theoretical Basis Document Version 3.0), 1997.*
(Continued)

*Primary Examiner* — James T Boylan
(74) *Attorney, Agent, or Firm* — Buchanan Ingersoll & Rooney PC

(57) ABSTRACT

A system and a method for determining a satellite image loss and a computer-readable recording medium therefor are provided. The satellite image loss determination system includes a data receiving unit configured to receive packet data including satellite image data, time information, and a flag value, and angle data of a scan mirror that generates the satellite image data; a data comparing unit configured to compare the angle data received by the data receiving unit with angle data of the scan mirror previously determined in correspondence with the packet data; and an image loss determining unit configured to determine whether a loss has occurred in a satellite image generated from the satellite image data in consideration of a result of comparison of the data comparing unit.

15 Claims, 10 Drawing Sheets

(51) Int. Cl.
*H04B 7/185* (2006.01)
*G06T 3/40* (2006.01)

(58) Field of Classification Search
USPC .......................................................... 348/144
See application file for complete search history.

(56) References Cited

U.S. PATENT DOCUMENTS

| | | | | |
|---|---|---|---|---|
| 2008/0225115 | A1* | 9/2008 | Matsushita | G01B 11/25 |
| | | | | 348/129 |
| 2010/0185362 | A1* | 7/2010 | Vialatte | G07C 5/085 |
| | | | | 701/33.4 |
| 2010/0303202 | A1* | 12/2010 | Ren | A61B 6/025 |
| | | | | 378/62 |
| 2014/0301660 | A1* | 10/2014 | Lee | G06T 5/005 |
| | | | | 382/275 |
| 2015/0116151 | A1 | 4/2015 | Liu et al. | |
| 2015/0348264 | A1* | 12/2015 | Yoon | B64G 1/244 |
| | | | | 348/117 |

FOREIGN PATENT DOCUMENTS

| | | |
|---|---|---|
| KR | 10-2009-0078186 A | 7/2009 |
| KR | 10-1303730 B1 | 9/2013 |
| KR | 10-2016-0077100 A | 7/2016 |
| WO | WO 2015/065880 A1 | 5/2015 |

OTHER PUBLICATIONS

Korean Office Action dated Jul. 18, 2017, in corresponding Korean Patent Application No. 10-2016-0144474. (6 pages).

\* cited by examiner

SYSTEM AND METHOD FOR DETERMINING SATELLITE IMAGE LOSS AND COMPUTER-READABLE RECORDING MEDIUM THEREFOR

CROSS-REFERENCE TO RELATED APPLICATION

This application claims the benefit of Korean Patent Application No. 10-2016-0144474, filed on Nov. 1, 2016, in the Korean Intellectual Property Office, the disclosure of which is incorporated herein in its entirety by reference.

BACKGROUND

1. Field

One or more embodiments relate to a system and a method for determining a satellite image loss and a computer-readable recording medium thereof, and more particularly, to a satellite image loss determination system and a method for determining whether a partial loss has occurred in a satellite image transmitted from an advanced meteorological imager (AMI), etc. using angle data of a scan mirror, packet data, etc., and a computer-readable recording medium therefor.

2. Description of the Related Art

Brightness object avoidance (BOA) means a function of not observing but avoiding the sun when the sun is within a certain angle, so as to protect a sensor of an advanced meteorological imager (AMI).

Currently, when a BOA function is used, the AMI notifies loss of satellite image by separate telemetry (TM) only if a whole swath is lost and has no separate alarm function when a partial image loss has occurred, and thus a method of determining the partial image loss is not present.

SUMMARY

One or more embodiments include a satellite image loss determination system and method capable of determining whether a partial loss has occurred in a satellite image and a computer-readable recording medium thereof.

Additional aspects will be set forth in part in the description which follows and, in part, will be apparent from the description, or may be learned by practice of the presented embodiments.

According to one or more embodiments, a satellite image loss determination system includes a data receiving unit configured to receive packet data including satellite image data, time information, and a flag value, and angle data of a scan mirror that generates the satellite image data; a data comparing unit configured to compare the angle data received by the data receiving unit with angle data of the scan mirror previously determined in correspondence with the packet data; and an image loss determining unit configured to determine whether a loss has occurred in a satellite image generated from the satellite image data in consideration of a result of comparison of the data comparing unit.

The satellite image data may include: $1^{st}$ through $n^{th}$ swaths of data, wherein the data comparing unit compares a range of the angle data received by the data receiving unit with an angle range of the scan mirror previously determined in correspondence with each of the $1^{st}$ through $n^{th}$ swaths of data, and wherein the image loss determining unit determines that the loss has occurred in the satellite image when the range of the received angle data is narrower than the previously determined angle range.

The data comparing unit may compare angle data of the scan mirror at time points where the flag value is a first value and a second value with angle data of the scan mirror previously determined in correspondence with the flag value, and wherein the image loss determining unit determines that the loss has occurred in the satellite image when a result of comparison of the data comparing unit is equal to or greater than a predetermined value.

The image loss determining unit may determine that a loss has occurred in a start position of the satellite image when a result of comparison at the time point where the flag value is the first value is equal to or greater than the predetermined value.

The image loss determining unit may determine that a loss has occurred in an end position of the satellite image when a result of comparison at the time point where the flag value is the second value is equal to or greater than the predetermined value.

The satellite image loss determination system may further include: an alarm output unit configured to output an alarm when it is determined that the loss has occurred in the satellite image.

The satellite image loss determination system may further include: an image interpolating unit configured to interpolate an image in which a loss has occurred.

According to one or more embodiments, a satellite image loss determination system includes: a data receiving unit configured to receive satellite image data including $1^{st}$ through $n^{th}$ swaths of data including a plurality of chunks of data; and an image loss determining unit configured to determine that a loss has occurred in a satellite image generated from the satellite image data when the number of the chunk data included in the $1^{st}$ through $n^{th}$ swaths of data is smaller than a predicted number.

According to one or more embodiments, a satellite image loss determination method includes receiving packet data including satellite image data, time information, and a flag value; receiving angle data of a scan mirror that generates the satellite image data; comparing the angle data received by the data receiving unit with angle data of the scan mirror previously determined in correspondence with the packet data; and determining whether a loss has occurred in a satellite image generated from the satellite image data in consideration of a result of the comparing.

The satellite image data may include: $1^{st}$ through $n^{th}$ swaths of data, wherein the comparing of the angle data includes: comparing a range of the angle data received in the receiving of the angle data with an angle range of the scan mirror previously determined in correspondence with each of the $1^{st}$ through $n^{th}$ swaths of data, and wherein the determining of whether the loss has occurred in the satellite image includes: determining that the loss has occurred in the satellite image when the range of the received angle data is narrower than the previously determined angle range.

Each of the $1^{st}$ through $n^{th}$ swaths of data may include a plurality of chunks of data, and wherein the determining of whether the loss has occurred in the satellite image includes: determining that the loss has occurred in the satellite image when the number of the chunks of data included in the $1^{st}$ through $n^{th}$ swaths of data is smaller than a predicted number.

The determining of whether the loss has occurred in the satellite image may include: determining that a loss has occurred in a start position of the satellite image when a result of comparison at a time point where the flag value is a first value is equal to or greater than a predetermined value.

The determining of whether the loss has occurred in the satellite image may include: determining that a loss has occurred in an end position of the satellite image when a result of comparison at a time point where the flag value is a second value is equal to or greater than a predetermined value.

The satellite image loss determination method may further include: outputting an alarm when it is determined that the loss has occurred in the satellite image.

The satellite image loss determination method may further include: interpolating the image in which the loss has occurred.

According to one or more embodiments, a satellite image loss determination method includes: receiving satellite image data including $1^{st}$ through $n^{th}$ swaths of data including a plurality of chunks of data; and determining that a loss has occurred in a satellite image generated from the satellite image data when the number of the chunks of data included in the $1^{st}$ through $n^{th}$ swaths of data is smaller than a predicted number.

According to one or more embodiments, a non-transitory computer-readable storage medium having stored thereon a program, which when executed by a computer, performs the satellite image loss determination method.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
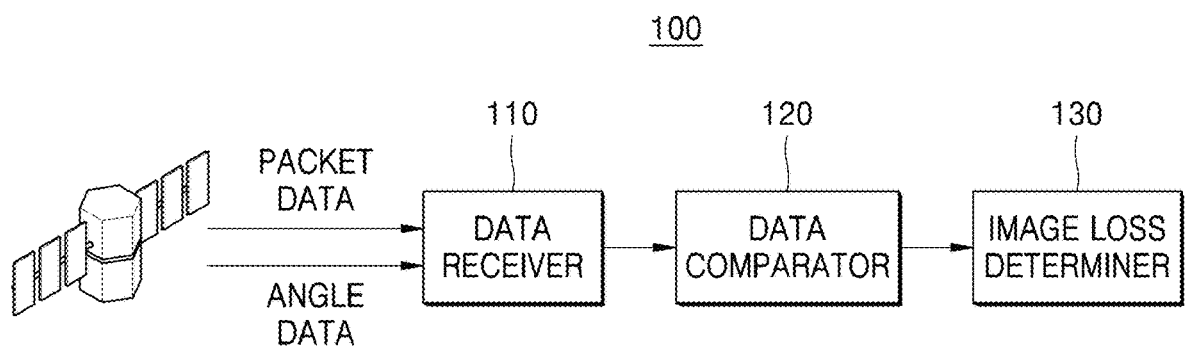
FIG. 1 is a diagram schematically showing a configuration of a satellite image loss determination system according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

Terms used in the present specification are used for explaining a specific embodiment, not for limiting the present inventive concept. Thus, an expression used in a singular form in the present specification also includes the expression in its plural form unless clearly specified otherwise in context. Also, terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof. While such terms as "first," "second," etc., may be used to describe various components, such components must not be limited to the above terms. The above terms are used only to distinguish one component from another.

FIG. 1 is a diagram schematically showing a configuration of a satellite image loss determination system 100 according to an embodiment.

Referring to FIG. 1, the satellite image loss determination system 100 according to an embodiment includes a data receiving unit 110, a data comparing unit 120, and an image loss determining unit 130.

The data receiving unit 110 receives packet data including satellite image data, time information, and a flag value, and angle data of a scan mirror that generates the satellite image data. A plurality of pieces of data received by the data receiving unit 110 is transmitted from a satellite that generates a satellite image using the scan mirror. The plurality pieces of data transmitted from the satellite may be largely classified into the packet data and the angle data.

The satellite image data included in the packet data refers to image data captured by the satellite. The time information may be understood as information regarding a time when the satellite image data is generated. The flag value is a value indicating information about a location of the satellite image data and will be described in more detail with reference to the figures that follow.

The data comparing unit 120 compares angle data of the scan mirror previously determined in correspondence with the packet data and the angle data received by the data receiving unit 110. A satellite image is generated by the scan mirror, which is adjusted by the previously determined angle data of the scan mirror. The satellite image data generated according to an angle of the scan mirror may be changed.

For example, by adjusting the angle of the scan mirror, the northern hemisphere of the earth may be captured when the angle of the scan mirror is a first angle, and the southern hemisphere of the earth may be captured when the angle of the scan mirror is a second angle.

On the other hand, the satellite may be set to capture a determined region at a determined time every day. The packet data includes the time information, which is information on a time when the satellite captures a specific region. Accordingly, if the time information included in the packet data is analyzed, it is possible to determine which region the satellite image data received together with the time information includes. Also, since different angle data of the scan mirror are designated according to a region to be captured, it is also possible to inversely extract the angle data corresponding thereto from the time information.

Also, the flag value indicates a start point and an end point of the satellite image data. A position where the satellite starts capturing and a position where the satellite ends capturing may be previously determined, and angle data of the scan mirror corresponding to a specific position may also be previously determined, and thus the angle data corresponding thereto may be inversely extracted from the flag value.

Therefore, the data comparing unit 120 compares the angle data of the scan mirror previously determined in correspondence with the satellite image data, the time information, and the flag value included in the packet data, and actual angle data of the scan mirror received from the satellite to compare whether the two types of data are identical to each other.

The image loss determining unit 130 determines whether a loss has occurred in the satellite image in consideration of a result of comparison of the data comparing unit 120. As described above, the satellite image data, the time information, and the flag value included in the packet data are respectively matched with the angle data of the scan mirror corresponding thereto. The satellite transmits the actual angle data of the scan mirror and compares the actual angle data with the angle data corresponding to the packet data, and thus the image loss determining unit 130 determines whether the loss has occurred in the satellite image.

For example, when an angle of the scan mirror is set to the first angle at 16:14, if the actual angle of the scan mirror transmitted from the satellite is not the first angle, the image loss determining unit 130 may determine that an image of a region set to be captured at 16:14 is not captured and that a loss has occurred in the image of the region.

Figure 2:
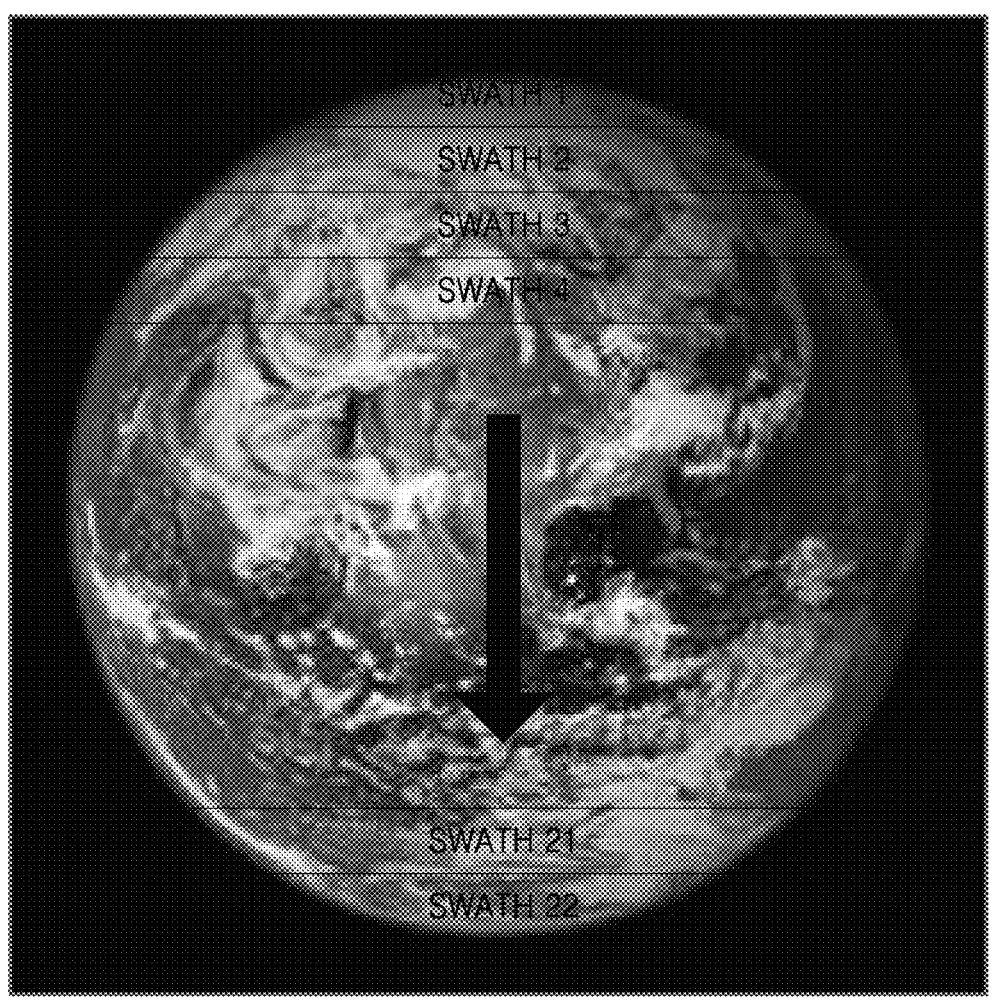
FIG. 2 is a diagram showing an example of a swath of data included in satellite image data.

FIG. 2 is a diagram showing an example of a swath of data included in satellite image data.

Referring to FIG. 2, the satellite image data provided by the satellite may include $1^{st}$ to $n^{th}$ swaths of data. FIG. 2 illustrates a satellite image generated by a geosynchronous satellite that captures the earth. The satellite image data corresponding to the satellite image includes $1^{st}$ through $22^{nd}$ swaths of data. In FIG. 2, although the satellite image data includes a total of 22 pieces of swaths of data, this is an example and the satellite image data may include more or less than 22 swaths of data.

As shown in FIG. 2, the swaths of data may be understood as image data for dividing the satellite image data into rows. Lengths of the swaths of data may be different from each other.

On the other hand, the swaths of data are different from each other in length and in a start position and an end position. Therefore, the swaths of data are also different from each other in angle data at the time of obtaining the swaths of data through a scan mirror.

The data comparing unit 120 may compare an angle range of the scan mirror previously determined in correspondence with each of the swaths of data with a range of the angle data received by the data receiving unit 110. The image loss determining unit 130 may determine that a loss has occurred in the satellite image when the range of the received angle data is narrower than the previously determined angle range.

For example, while a region corresponding to a $1^{st}$ swath Swath 1 is captured, the angle range of the scan mirror may be previously determined and angles of the scan mirror between an east-west direction and a north-south direction may be independently adjusted. While the region corresponding to the $1^{st}$ swath Swath 1 is captured, the angle of the scan mirror in the north-south direction may be maintained constant, and the angle of the scan mirror in the east-west direction may be changed according to the previously determined angle range.

While the $1^{st}$ swath Swath 1 is obtained, if brightness object avoidance (BOA) occurs near a left start point of the $1^{st}$ swath Swath 1, a position corresponding to the left start point may not be captured. Therefore, a range in the east-west angle of the scan mirror corresponding to a point where actual satellite image data is generated may be different from the previously determined angle range, and an angle range of the scan mirror received from the satellite may be narrower than the previously determined angle range.

At this time, the image loss determining unit 130 may determine that a partial image loss has occurred in the $1^{st}$ swath Swath 1. However, when only angle ranges are compared, although the image loss determining unit 130 may determine that a partial loss has occurred in an image, it may be difficult to determine in which part an image loss has occurred.

Therefore, in order to determine a position where the image loss has occurred, a process of comparing angle data of the scan mirror at a capture start point and angle data at a capture end point with previously determined angle data is necessary.

Figure 3:
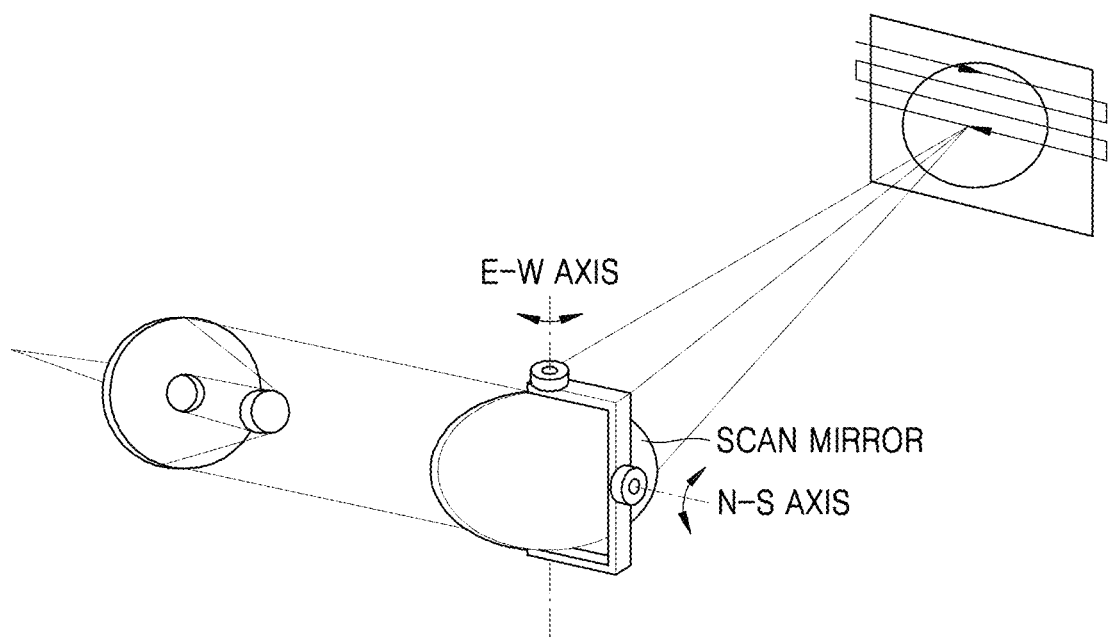
FIG. 3 is a diagram schematically showing a configuration of a meteorological imager that generates satellite image data.

FIG. 3 is a diagram schematically showing a configuration of a meteorological imager that generates satellite image data.

Referring to FIG. 3, the meteorological imager includes a scan mirror and receives a target observation region from a ground command. The scan mirror scans the observation region while moving using two axes in east, west, south, and north directions.

In FIG. 3, the scan mirror performs a process of scanning the observation region in a longitudinal direction while in a row direction from left to right or from right to left. Therefore, it may be understood that a plurality of swaths of data are generated as described with reference to FIG. 2.

Although a scan direction shown in FIG. 3 is changed from left to right or from right to left every time swaths are changed, this is merely an example. When each swath is scanned, the scan direction of the scan mirror may be always from left to right or from right to left. Alternatively, the scan direction of the scan mirror may be an oblique direction.

Figure 4:
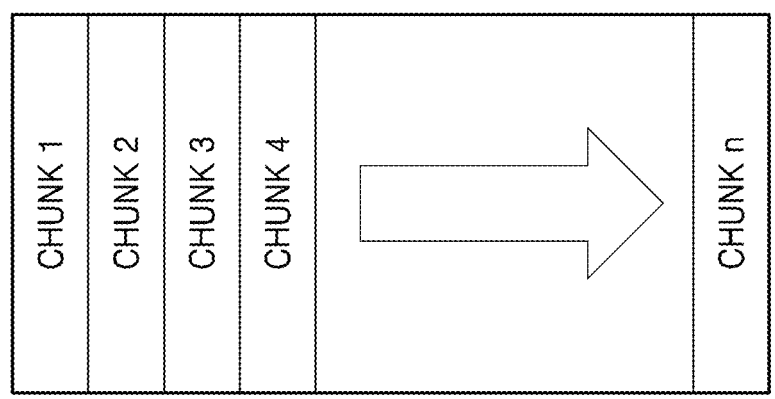
FIG. 4 is a diagram showing an example of chunks of data included in a swath of data.

FIG. 4 is a diagram showing an example of chunks of data included in a swath of data.

One swath of data may include a plurality of chunks of data. The longer the swath is, the larger the number of chunks of data that may be included in the swath of data corresponding thereto.

In general, one chunk (or chunk of data) corresponds to about 244 μrad of a scan mirror in a visible and near-infrared band, about 112 μrad in a VIS06 band, and about 448 μrad in an infrared band.

Thus, it may be understood in FIG. 3 that the $1^{st}$ swath Swath 1 and the $22^{nd}$ swath Swath 22 include the smallest number of chunks of data, and an $11^{th}$ swath and a $12^{th}$ swath include the largest number of chunks of data.

On the other hand, when the number of chunks of data included in the $1^{st}$ to $n^{th}$ swaths of data is smaller than a predicted number, the image loss determining unit 130 may determine that a loss has occurred in a satellite image.

For example, when it is predicted that 400 pieces of chunks of data are to be included in the $1^{st}$ swath Swath 1, if it is determined that the $1^{st}$ swath Swath 1 of actual satellite image data received from the satellite includes a smaller number of chunks of data than 400, the image loss determining unit 130 may determine that an image loss has occurred in the $1^{st}$ swath Swath 1.

Accordingly, the image loss determining unit 130 may further perform a function of determining a number of chunks of data included in the swath of data included in the satellite image data received from the satellite. Such a function may be performed by the data comparing unit 120.

Alternatively, a satellite image loss determination system according to another embodiment may not include a data comparing unit. In this case, a data receiving unit receives the satellite image data, and an image loss determining unit may determine a number of chunks of data included in each of the $1^{st}$ to $n^{th}$ swaths of data included in the satellite image data.

If the number of the chunks of data included in the $1^{st}$ to $n^{th}$ swaths of data is smaller than a predicted number according to a result of determination, it may be determined that the image loss has occurred in a swath of data including a smaller number of chunks of data than the predicted value.

Therefore, in this case, it is possible to determine whether a loss has occurred in the satellite image even when time information, a flag value, and angle data of the scan mirror are not obtained.

Also, the satellite image loss determination system 100 according to one or more embodiments may further include a database (not shown) that stores the satellite image data, the time information, the flag value, and angle data of the scan mirror corresponding to respective information.

The data comparing unit 120 or the image loss determining unit 130 may compare the angle data of the scan mirror stored in the database with the actual angle data of the scan mirror received from the satellite.

FIGS. 5A through 6B are diagrams describing an example of a method of determining whether an image loss has occurred, according to an embodiment.

Figure 5A:
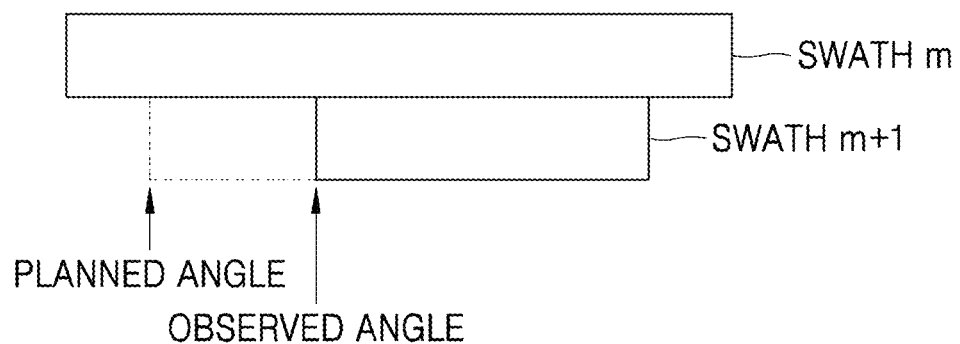
FIGS. 5A through 6B are diagrams for describing an example of a method of determining whether an image loss has occurred, according to an embodiment.
Figure 5B:
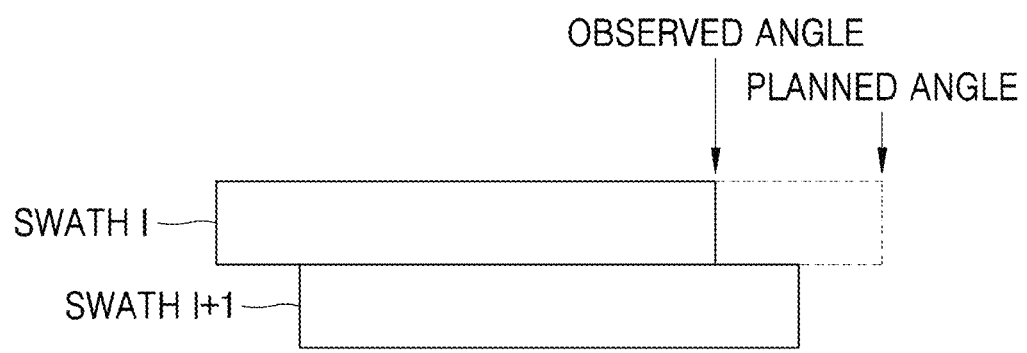

FIGS. 5A and 5B are diagrams for describing an example of a method of determining whether the image loss has occurred by using a swath of data and angle data of a scan mirror. First, referring to FIG. 5A, a case is shown where an $m^{th}$ swath m is received and an $m+1^{th}$ swath m+1 is received.

When satellite image data is received from a satellite, information on a number of swaths currently received together, and time information, in which a corresponding chunk of data is generated for each of a plurality of chunks of data included in each swath, is received together with a flag value. Also, as described with reference to the preceding drawings, while the each swath is being generated the angle data of the scan mirror is received with the each swath.

In FIG. 5A, when reception of the $m^{th}$ swath m is completed, the data receiving unit 110 may expect reception of the $m+1^{th}$ swath m+1 to start. Among the plurality of chunks of data constituting one swath, a chunk of data corresponding to a start position of the swath is assigned a first value as a flag value and a chunk of data corresponding to an end position of the swath is assigned a second value as the flag value. A remaining chunk of data is assigned a third value as the flag value. Therefore, if the chunk of data having the second value as the flag value is received, the chunk of data received immediately thereafter has the first value as the flag value. The data receiving unit 110 may determine a start and an end of the swath through the flag value assigned to the chunk of data.

Meanwhile, in the present specification, the one or more embodiments will be described on the assumption that the first value is 1, the second value is 2, and the third value is 0.

Also, since angle data (or an angle range) of the scan mirror corresponding to each swath is previously determined, if the reception of the $m+1^{th}$ swath m+1 starts, the data receiving unit 110 receives the angle data of the scan mirror corresponding to the $m+1^{th}$ swath m+1.

A planned angle corresponding to a start position of the $m+1^{th}$ swath m+1 may be previously determined, and magnitude of the planned angle and an actually observed angle may be compared to determine whether the image loss has occurred.

For example, when the planned angle corresponding to the start position is −17 degrees and the observed angle is −14 degrees, the image loss determining unit 130 may determine that the image loss has occurred in the start position of the $m+1^{th}$ swath m+1.

Similarly, in the example of FIG. 5B, a case where the image loss has occurred in an end position of the swath is shown as an example. In FIG. 5B, a planned angle corresponding to an end position of the $1^{st}$ swath 1 and the actually observed angle may be compared to determine whether the image loss has occurred in the end position.

For example, if the planned angle corresponding to the end position of the $1^{st}$ swath 1 is 17 degrees and the observed angle is 14 degrees, the image loss determining unit 130 may determine that the image loss has occurred in a start position of the $1^{st}$ swath 1.

Figure 6A:
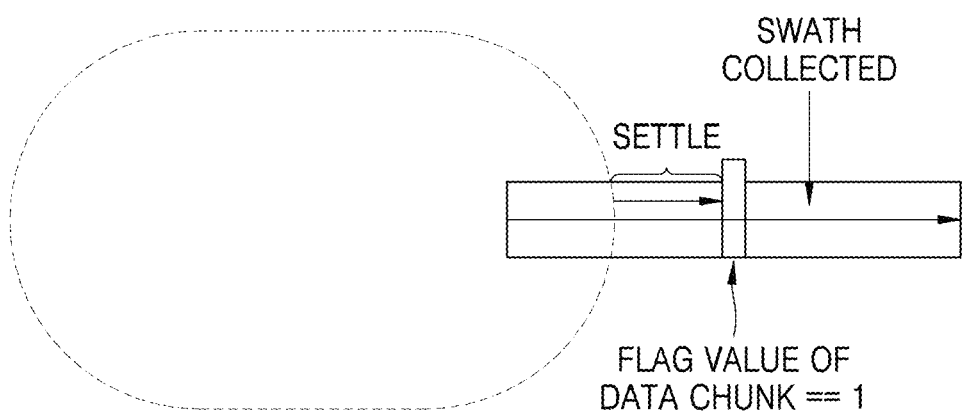
Figure 6B:
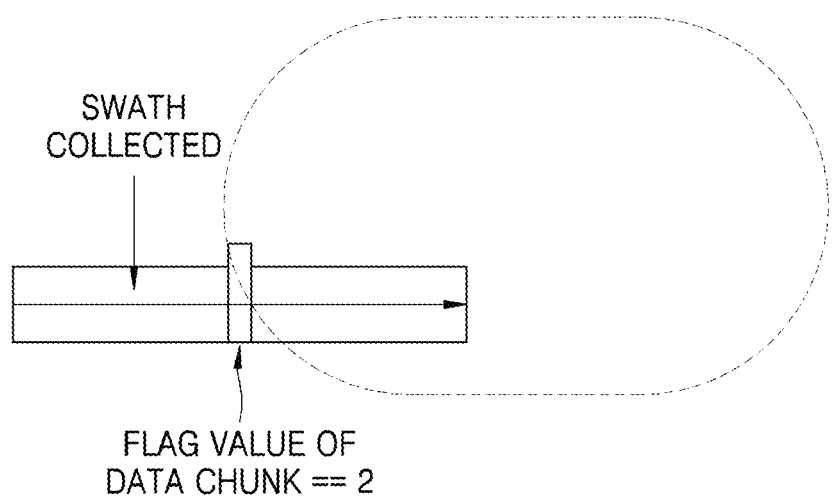

It is assumed that the dotted lines in FIGS. 6A and 6B represent the earth. First, referring to FIG. 6A, a case where a BOA has occurred in a start position of a swath and a partial loss has occurred in an image is shown as an example.

When BOA occurs, no swath is generated during a certain time Settle. When the generation of a swath starts after the lapse of the certain time Settle, an initially generated flag value of data chunk is set to 1.

Among a plurality of chunks of data constituting one swath, a chunk of data corresponding to a start position of the swath is assigned 1 as a flag value and a chunk of data corresponding to an end position of the swath is assigned 2 as the flag value. A remaining chunk of data is assigned 0 as the flag value. Therefore, if the chunk of data having 2 as the flag value is received, the chunk of data received immediately thereafter has 1 as the flag value. The data receiving unit 110 may determine a start and an end of the swath through the flag value assigned to the chunks of data.

The data comparing unit 120 compares angle data of a scan mirror at time points where the flag value is 1 and 2 and angle data of the scan mirror previously determined in correspondence with the flag value. When a result of comparison of the data comparing unit 120 is equal to or greater than a predetermined value, the image loss determining unit 130 may determine that a loss has occurred in the satellite image.

In FIG. 6A, when a chunk of data including the flag value of data chunk of 1 is received, the data comparing unit 120 compares the angle data of the scan mirror corresponding to the flag value of 1 with an observed angle of the scan mirror corresponding to the chunk of data received from the satellite.

In case of FIG. 6A, since BOA occurs in a start point of the swath and the image loss has occurred, the flag value of 1 is assigned to a chunk of data of a position where 0 needs to be assigned as the flag value. Also, since there is a difference between the angle data corresponding to the chunk of data originally having the flag value of 1 and the angle data corresponding to the chunk of data actually having the flag value of 1, the image loss determining unit 130 may determine that the image loss has occurred in a start position of the corresponding swath in consideration of the difference between the angle data.

More specifically, the image loss determining unit 130 may determine that a loss has occurred in a start position of a satellite image when the result of comparison is equal to or greater than the predetermined value at the time point where the flag value is 1. The reason for determining that the loss has occurred when the result of comparison is equal to or greater than the predetermined value is to consider an error that may occur between predicted data and actual data even when BOA does not occur.

On the other hand, referring to FIG. 6B, a case where BOA has occurred in an end position of the swath and a partial image loss has occurred is shown as an example. In FIG. 6B, when a chunk of data having the flag value of data chunk of 2 is received, the data comparing unit 120 compares the angle data of the scan mirror corresponding to the flag value of 2 with the observed angle of the scan mirror corresponding to the chunk of data received from the satellite.

In case of FIG. 6B, since BOA occurs in an end point of the swath and the image loss has occurred, the flag value of 2 is assigned to the chunk of data of the position where 0 needs to be assigned as the flag value. Also, since there is a difference between the angle data corresponding to the chunk of data originally having the flag value of 2 and the angle data corresponding to the chunk of data actually having the flag value of 2, the image loss determining unit 130 may determine that the image loss has occurred in an end position of the corresponding swath in consideration of the difference between the angle data.

More specifically, the image loss determining unit 130 may determine that a loss has occurred in an end position of the satellite image when the result of comparison is equal to or greater than the predetermined value at the time point where the flag value is 2.

Figure 7:
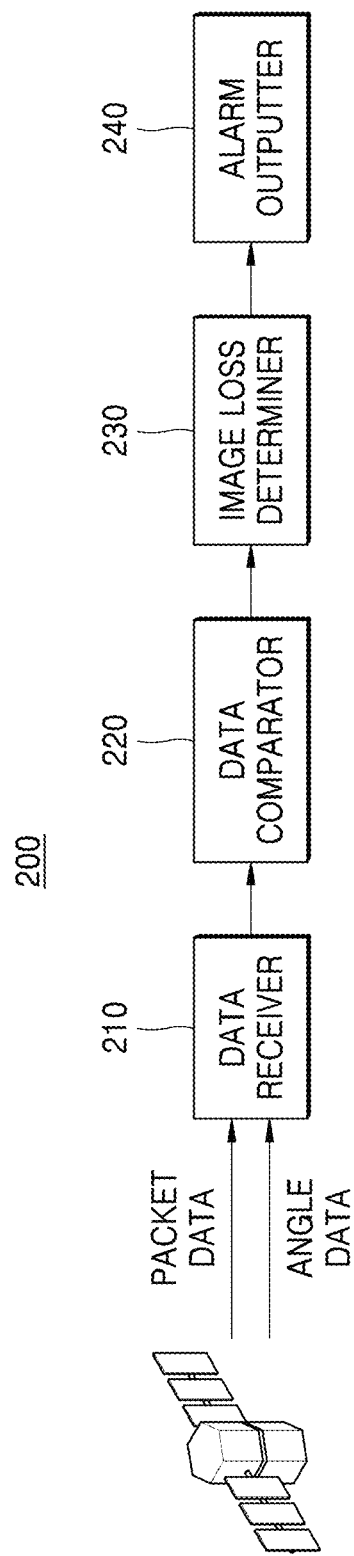
FIGS. 7 and 8 are diagrams schematically showing configurations of satellite image loss determination systems, according to another embodiment.
Figure 8:
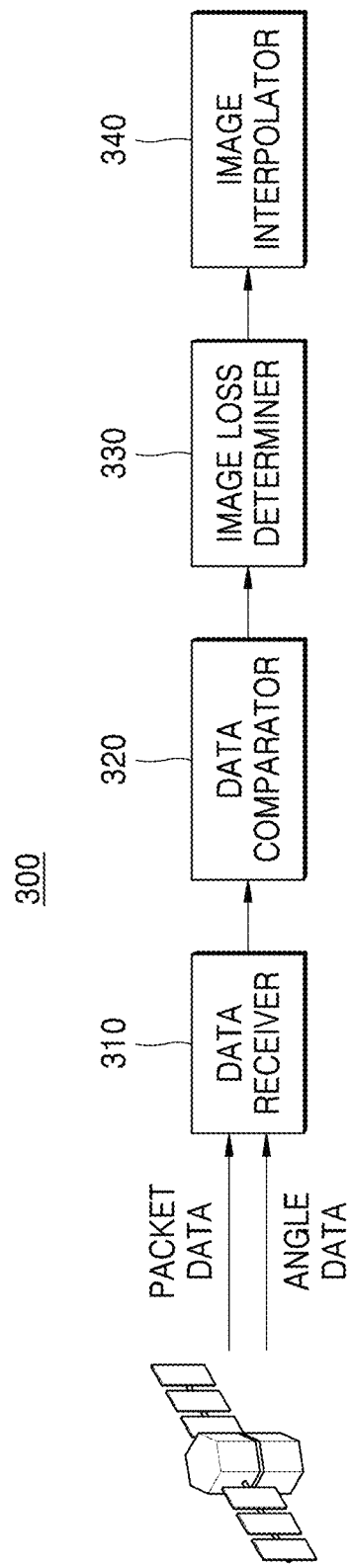

FIGS. 7 and 8 are diagrams schematically showing configurations of satellite image loss determination systems 200 and 300 respectively according to another embodiment.

Referring to FIG. 7, the satellite image loss determination system 200 according to another embodiment includes a data receiving unit 210, a data comparing unit 220, an image loss determining unit 230, and an alarm output unit 240. The data receiving unit 210, the data comparing unit 220 and the image loss determining unit 230 perform substantially the same functions as the data receiving unit 110, the data comparing unit 120 and the image loss determining unit 130 described with reference to FIG. 1, and thus redundant descriptions will be omitted.

The alarm output unit 240 outputs an alarm when it is determined that a loss has occurred in a satellite image. In the conventional system, if a loss has occurred in an entirety of one swath, an image loss may be determined, whereas if a loss has occurred in a part of the swath, there is a problem that the loss may not be detected.

The alarm output unit 240 outputs the alarm even when a partial loss has occurred in the satellite image, so that a user may grasp a swath having the partial image loss and an image loss position of the swath. Accordingly, the alarm may include information on a number of swaths in which an image loss has occurred, a number of chunks corresponding to a position where the image loss has occurred, and the like.

Meanwhile, referring to FIG. 8, the satellite image loss determination system 300 according to another embodiment includes a data receiving unit 310, a data comparing unit 320, an image loss determining unit 330, and an image interpolating unit 340. The data receiving unit 310, the data comparing unit 320 and the image loss determining unit 330 perform substantially the same functions as the data receiving unit 110, the data comparing unit 120 and the image loss determining unit 130 described with reference to FIG. 1, and thus redundant descriptions will be omitted.

The image interpolating unit 340 interpolates an image in which a loss has occurred determined by the image loss determining unit 330. As described with reference to the preceding drawings, it is possible to determine at which position the image loss has occurred when a partial loss has occurred in the satellite image, and the image in which the loss has occurred may be expressed by an angle data range of a scan mirror or a number of chunks of data, etc.

Accordingly, if the image in which the loss has occurred is present, the image interpolating unit 340 may perform image interpolation by inserting a chunk of data including previous image data into a position of a chunk of data in which the loss has occurred using previously received normal satellite image data.

Alternatively, it is also possible to determine an angle range corresponding to the image in which the loss has occurred in a planned angle range of the scan mirror and to insert an image corresponding to the angle range in the previously received normal satellite image data accordingly.

Figure 9:
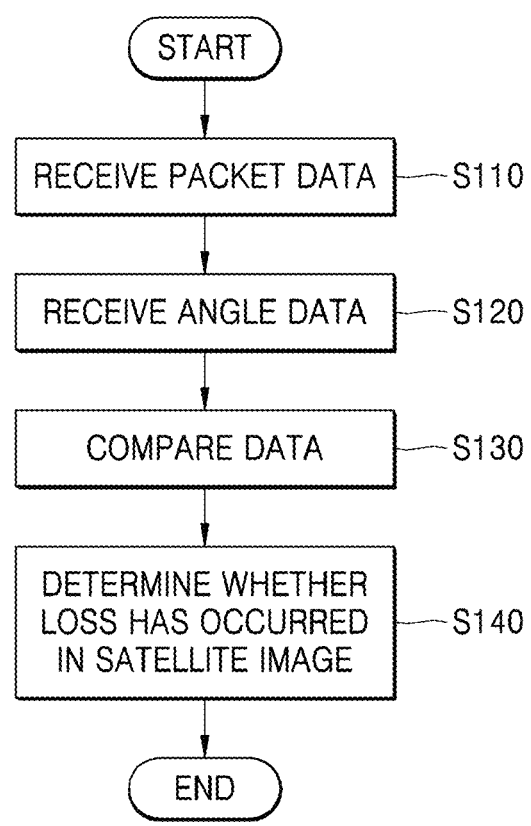
FIG. 9 is a flowchart schematically showing a satellite image loss determination method according to an embodiment.

FIG. 9 is a flowchart schematically showing of a satellite image loss determination method according to an embodiment.

Referring to FIG. 9, the satellite image loss determination method according to an embodiment includes operations of receiving packet data (S110), receiving angle data (S120), comparing data (S130), and determining whether a loss has occurred in a satellite image (S140).

In the operation of receiving the packet data (S110), the packet data including satellite image data, time information, and a flag value is received. The satellite image data included in the packet data refers to image data captured by a satellite. The time information may be understood as information regarding a time when the satellite image data is generated. The flag value is a value indicating information on a position of the satellite image data.

In the operation of receiving the angle data (S120), the angle data of a scan mirror that generates the satellite image data is received. It may be understood that the packet data and the angle data received in the operations of receiving the packet data (S110) and receiving the angle data (S120) are transmitted from the satellite that generates a satellite image using the scan mirror.

In the operation of comparing the data (S130), angle data of the scan mirror previously determined in correspondence with the packet data is compared with the received angle data of the scan mirror.

The satellite image is generated by the scan mirror, which is adjusted by predetermined angle data of the scan mirror. The satellite image data generated according to an angle of the scan mirror may be changed.

For example, by adjusting the angle of the scan mirror, the northern hemisphere of the earth may be captured when the angle of the scan mirror is a first angle, and the southern hemisphere of the earth may be captured when the angle of the scan mirror is a second angle.

On the other hand, the satellite may be set to capture a determined region at a determined time every day. The packet data includes the time information, which is information on a time when the satellite captures a specific region. Accordingly, if the time information included in the packet data is analyzed, it is possible to determine which region the satellite image data received together with the time information includes. Also, since different angle data of the scan mirror are designated according to a region to be captured, it is also possible to inversely extract the angle data corresponding thereto from the time information.

Also, the flag value indicates a start point and an end point of the satellite image data. A position where the satellite starts capturing and a position where the satellite ends capturing may be previously determined, and angle data of the scan mirror corresponding to a specific position may also be previously determined, and thus the angle data corresponding thereto may be inversely extracted from the flag value.

Therefore, in the operation of comparing the data (S130), the angle data of the scan mirror previously determined in correspondence with the satellite image data, the time information, and the flag value included in the packet data are compared with actual angle data of the scan mirror received from the satellite to compare whether the two types of data are identical to each other.

The operation of determining whether the loss has occurred in the satellite image (S140) determines whether the loss has occurred in the satellite image in consideration of a result of the operation of comparing the data (S130). As described above, the satellite image data, the time information, and the flag value included in the packet data are respectively matched with the angle data of the scan mirror corresponding thereto. The satellite transmits the actual angle data of the scan mirror and compares the actual angle data with the angle data corresponding to the packet data, and thus in the operation of determining whether the loss has occurred in the satellite image (S140), it is determined whether the loss has occurred in the satellite image.

For example, when an angle of the scan mirror is set to the first angle at 16:14, if the actual angle of the scan mirror transmitted from the satellite is not the first angle, it may be determined that an image of a region set to be captured at 16:14 is not captured. In the operation of determining whether the loss has occurred in the satellite image (S140), it may be determined that a loss has occurred in the image of the region.

Meanwhile, the satellite image data includes the $1^{st}$ to $n^{th}$ swaths of data. In the operation of comparing the data (S130), an angle range of the scan mirror previously determined in correspondence with each of the swaths of data may be compared with the range of the angle data received in operation of receiving the angle data (S120). In the operation of determining whether the loss has occurred in the satellite image (S140), it may be determined that a loss has occurred in the satellite image when the range of the received angle data is narrower than the previously determined angle range.

The $1^{st}$ to $n^{th}$ swaths of data each include a plurality of chunks of data. When the number of the chunks of data included in the $1^{st}$ to $n^{th}$ swaths of data is smaller than a predicted number, in the operation of determining whether the loss has occurred in the satellite image (S140), it may be determined that the loss has occurred in the satellite image.

Alternatively, the satellite image loss determination method according to another embodiment may not include operations of receiving the angle data and comparing the data. In this case, an operation of receiving the packet data may include receiving satellite image data including $1^{st}$ to $n^{th}$ swaths of data including a plurality of chunks of data, and an operation of determining whether the loss has occurred in the satellite image may include determining that the loss has occurred in the satellite image when the number of chunks of data included in the $1^{st}$ to $n^{th}$ swaths of data is smaller than the predicted number.

Therefore, in this case, it is possible to determine whether the loss has occurred in the satellite image even when the time information, the flag value, and the angle data of the scan mirror are not obtained.

As described with reference to FIGS. 2 and 4, the swaths of data are different from each other in length and in a start position and an end position. Therefore, the swaths of data are also different from each other in angle data at the time of obtaining the swaths of data through the scan mirror.

In the operation of comparing the data (S130), the angle range of the scan mirror previously determined in correspondence with each of the swaths of data may be compared with the range of the angle data received in the operations of receiving packet data (S110) and receiving angle data (S120). In operation of determining whether the loss has occurred in the satellite image (S140), it may be determined that the loss has occurred in the satellite image when the range of the received angle data is smaller than the previously determined angle range.

For example, while a region corresponding to the $1^{st}$ swath Swath 1 is captured, the angle range of the scan mirror may be previously determined and angles of the scan mirror between an east-west direction and a north-south direction may be independently adjusted as described with reference to FIG. 3. While the region corresponding to the $1^{st}$ swath Swath 1 is captured, the angle of the scan mirror in the north-south direction may be maintained constant, and the angle of the scan mirror in the east-west direction may be changed according to the previously determined angle range.

While the $1^{st}$ swath Swath 1 is obtained, if brightness object avoidance (BOA) occurs near a left start point of the $1^{st}$ swath Swath 1, a position corresponding to the left start point may not be captured. Therefore, a range in the east-west angle of the scan mirror corresponding to a point where actual satellite image data is generated may be different from the previously determined angle range, and the angle range of the scan mirror received from the satellite may be smaller than the previously determined angle range.

At this time, in the operation of determining whether the loss has occurred in the satellite image (S140), it may be determined that a partial image loss has occurred in the $1^{st}$ swath Swath 1. However, when only angle ranges are compared, although it may be determined that a partial loss has occurred in an image, it may be difficult to determine in which part an image loss has occurred.

Therefore, in order to determine a position where the image loss has occurred, a process of comparing angle data of the scan mirror at a capture start point and angle data at a capture end point with previously determined angle data is necessary.

Meanwhile, in the operation of determining whether the loss has occurred in the satellite image (S140), it may be determined that the loss has occurred in the satellite image when the number of chunks of data included in the $1^{st}$ to $n^{th}$ swaths of data is smaller than a predicted number.

For example, when it is predicted that 400 chunks of data are to be included in the $1^{st}$ swath Swath 1, if it is determined that the $1^{st}$ swath Swath 1 of actual satellite image data received from the satellite includes a smaller number of chunks of data than 400, the operation of determining whether the loss has occurred in the satellite image (S140) may determine that an image loss has occurred in the $1^{st}$ swath Swath 1.

Accordingly, in the operation of determining whether the loss has occurred in the satellite image (S140), a function of determining a number of chunks of data that are included in the swath of data included in the satellite image data received from the satellite may be further performed. Such a function may be performed in the operation of comparing the data (S130).

Meanwhile, in the operation of comparing the data (S130), angle data of the scan mirror at time points where the flag value is 1 and 2 is compared with angle data of the scan mirror previously determined in correspondence with the flag value. When a result of the operation of comparing the data (S130) is equal to or greater than a predetermined value, in the operation of determining whether the loss has occurred in the satellite image (S140), it may be determined that the loss has occurred in the satellite image.

More specifically, in the operation of determining whether the loss has occurred in the satellite image (S140), it may be determined that a loss has occurred in a start position of the satellite image when the result of comparison is equal to or greater than the predetermined value at the time point where the flag value is 1, and may determine that the loss has occurred in an end position of the satellite image when the result of comparison is equal to or greater than the predetermined value at the time point where the flag value is 2.

Among a plurality of chunks of data constituting one swath, the chunk of data corresponding to a start position of the swath is assigned 1 as a flag value and the chunk of data corresponding to an end position of the swath is assigned 2 as the flag value. The remaining chunk of data is assigned 0 as the flag value. Therefore, if the chunk of data having 2 as the flag value is received, the chunk of data received immediately thereafter has 1 as the flag value. In the operation of receiving the packet data (S110), a start and an end of the swath may be determined through the flag value assigned to the chunk of data.

Figure 10:
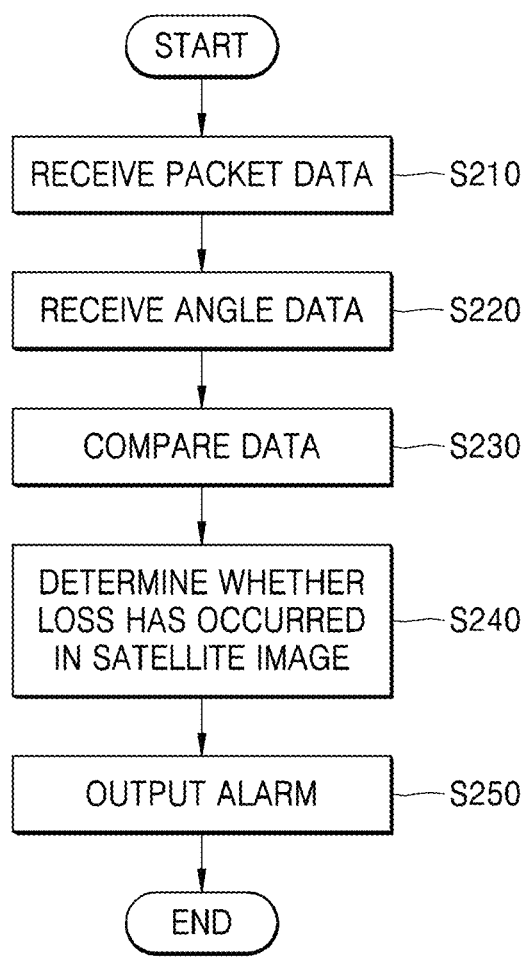
FIGS. 10 and 11 are flowcharts schematically showing a satellite image loss determination method according to another embodiment.
Figure 11:
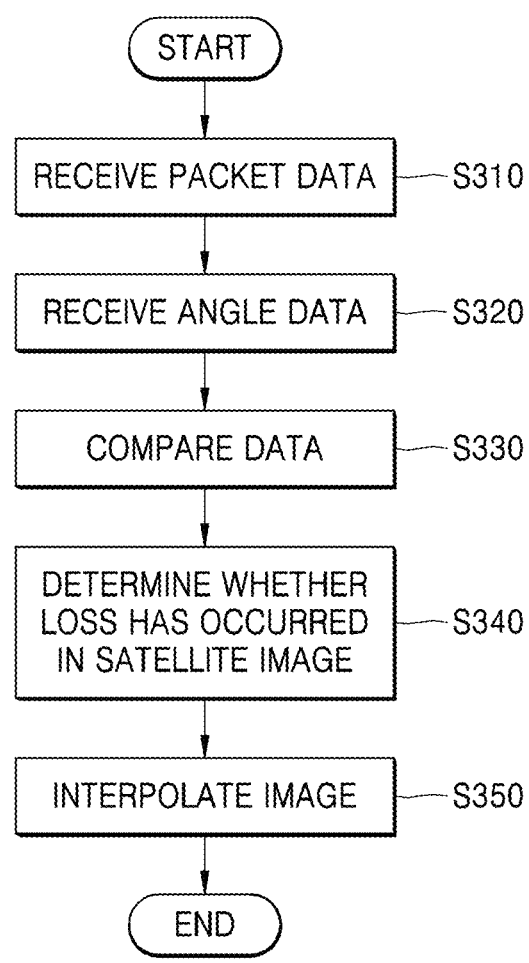

FIGS. 10 and 11 are flowcharts schematically showing of a satellite image loss determination method according to another embodiment.

Referring to FIG. 10, the satellite image loss determination method according to another embodiment includes operations of receiving packet data (S210), receiving angle data (S220), comparing data (S230), determining whether a loss has occurred in a satellite image (S240), and outputting an alarm (S250).

Operations of receiving packet data (S210), receiving angle data (S220), comparing data (S230), and determining whether the loss has occurred in the satellite image (S240) may be substantially the same as operations of receiving packet data (S110), receiving angle data (S120), comparing data (S130), and determining whether a loss has occurred in a satellite image (S140) described with reference to FIG. 9, and thus further redundant descriptions thereof are herein omitted.

In the operation of outputting the alarm (S250), when it is determined that the loss has occurred in the satellite image, the alarm is output. In a conventional system, if a loss has occurred in an entirety of one swath, an image loss may be determined, whereas if a loss has occurred in a portion of the swath, there is a problem that the loss may not be detected.

In the operation of outputting the alarm (S250), the alarm is output even when a partial loss has occurred in the satellite image so that a user may grasp a swath having the partial image loss and an image loss position of the swath. Accordingly, the alarm may include information on a number of swaths in which an image loss has occurred, a number of chunks corresponding to a position where the image loss has occurred, and the like.

Meanwhile, referring to FIG. 11, the satellite image loss determination method according to another embodiment includes operations of receiving packet data (S310), receiving angle data (S320), comparing data (S330), determining whether a loss has occurred in a satellite image (S340), and interpolating an image (S350).

The operations of receiving packet data (S310), receiving angle data (S320), comparing data (S330), and determining whether the loss has occurred in the satellite image (S340) may be substantially the same as the operations of receiving packet data (S110), receiving angle data (S120), comparing data (S130), and determining whether a loss has occurred in a satellite image (S140) described with reference to FIG. 9, and thus redundant further descriptions thereof are herein omitted.

In the operation of interpolating the image (S350), an image in which a loss has occurred is interpolated. In the operation of interpolating the image (S350), a function of interpolating is performed on the image in which the loss has occurred as determined in the operation of determining whether the loss has occurred in the satellite image (S340). As described with reference to the preceding drawings, it is possible to determine at which position the image loss has occurred when a partial loss has occurred in the satellite image, and the image in which the loss has occurred may be expressed by an angle data range of a scan mirror or a number of chunks of data, etc.

Accordingly, if the image in which the loss has occurred is present, in the operation of interpolating the image (S350), image interpolation may be performed by inserting a chunk of data including previous image data into a position of a chunk of data in which the loss has occurred using previously received normal satellite image data.

Alternatively, it is also possible to determine an angle range corresponding to the image in which the loss has occurred in a planned angle range of the scan mirror and to insert an image corresponding to the angle range in the previously received normal satellite image data accordingly.

The inventive concept may also be embodied as computer-readable codes on a computer-readable recording medium. The computer-readable recording medium is any data storage device that may store data which may be thereafter read by a computer system. Examples of the computer-readable recording medium include read-only memory (ROM), random-access memory (RAM), CD-ROMs, magnetic tapes, floppy disks, optical data storage devices, etc.

The computer-readable recording medium may also be distributed over network-coupled computer systems so that the computer-readable code is stored and executed in a distributed fashion. Also, functional programs, codes, and code segments for accomplishing the present inventive concept may be easily construed by programmers of ordinary skill in the art to which the present inventive concept pertains.

The use of any and all examples, or language (e.g., "such as") provided herein, is intended merely to better illuminate the inventive concept and does not pose a limitation on the scope of the inventive concept unless otherwise claimed. Numerous modifications and adaptations will be readily apparent to one of ordinary skill in the art without departing from the spirit and scope of the present inventive concept.

One or more embodiments may provide a satellite image loss determination system and method capable of determining whether a partial loss has occurred in a satellite image and a computer-readable recording medium thereof It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the inventive concept as defined by the following claims.

What is claimed is:

1. A satellite image loss determination system comprising:
a data receiving unit configured to receive packet data comprising satellite image data, time information, and a flag value, and angle data of a scan mirror, when the satellite image data is generated, from a satellite, the satellite having an imager to generate the satellite image data using the scan mirror;
a data comparing unit configured to determine a planned angle of the scan mirror based on the time information and the flag value of the packet data, to determine an observed angle of the scan mirror based on the angle data, and to compare the observed angle with the planned angle; and
an image loss determining unit configured to determine whether a loss has occurred in the satellite image data, based on the comparison of the data comparing unit.

2. The satellite image loss determination system of claim 1, wherein the satellite image data comprises: $1^{st}$ through $n^{th}$ swaths of data,
wherein the data comparing unit is to determine a range of the planned angles corresponding to one of the $1^{st}$ through $n^{th}$ swaths of data, to determine a range of the observed angles based on the angle data received along with the one of the $1^{st}$ through $n^{th}$ swaths of data, and compare the range of the planned angles with the range of the observed angles in correspondence with the one of the $1^{st}$ through $n^{th}$ swaths of data, and
wherein the image loss determining unit is to determine that the loss has occurred in the satellite image data when the range of the observed angle is narrower than the range of the planned angles.

3. The satellite image loss determination system of claim 1,
wherein the data comparing unit is to determine the planned angle of the scan mirror at a time point where the flag value of the packet data is a first value or a second value, to determine the observed angle of the scan mirror at the time point based on the angle data received along with the flag value, and to compare the planned angle of the scan mirror with the observed angle of the scan mirror, and
wherein the image loss determining unit is to determine that the loss has occurred in the satellite image data when a difference between the planned angle of the scan mirror and the observed angle of the scan mirror is equal to or greater than a predetermined value.

4. The satellite image loss determination system of claim 3, wherein the image loss determining unit determines that a loss has occurred in a start position of the satellite image data when the difference between the planned angle of the scan mirror and the observed angle of the scan mirror at the time point where the flag value is the first value is equal to or greater than the predetermined value.

5. The satellite image loss determination system of claim 3, wherein the image loss determining unit determines that a loss has occurred in an end position of the satellite image data when the difference between the planned angle of the scan mirror and the observed angle of the scan mirror at the time point where the flag value is the second value is equal to or greater than the predetermined value.

6. The satellite image loss determination system of claim 1, further comprising: an alarm output unit configured to output an alarm when it is determined that the loss has occurred in the satellite image data.

7. The satellite image loss determination system of claim 1, further comprising: an image interpolating unit configured to interpolate the satellite image data in which the loss has occurred.

8. A satellite image loss determination method comprising:
receiving packet data comprising satellite image data, time information, and a flag value from a satellite, the satellite having an imager to generate the satellite image data using a scan mirror;
receiving, from the satellite, angle data of the scan mirror when the satellite image data is generated;
determining a planned angle of the scan mirror based on the time information and the flag value of the packet data;
determining an observed angle of the scan mirror based on the angle data;
comparing the observed angle with the planned angle; and
determining whether a loss has occurred in the satellite image data based on a result of the comparing.

9. The satellite image loss determination method of claim 8, wherein the satellite image data comprises: $1^{st}$ through $n^{th}$ swaths of data,
wherein the comparing of the angle data comprises:
determining a range of the planned angles corresponding to one of the $1^{st}$ through $n^{th}$ swaths of data;
determining a range of the observed angles based on the angle data received along with the one of the $1^{st}$ through $n^{th}$ swaths of data; and
comparing the range of the observed angles angle data received in the receiving of the angle data with the range of the observed angles in correspondence with the one of the $1^{st}$ through $n^{th}$ swaths of data, and
wherein the determining of whether the loss has occurred in the satellite image data comprises: determining that the loss has occurred in the satellite image data when the range of the observed angles is narrower than the range of the planned angles.

10. The satellite image loss determination method of claim 9,
wherein each of the $1^{st}$ through $n^{th}$ swaths of data is designed to have predetermined number of chunk data, and
wherein the determining of whether the loss has occurred in the satellite image data comprises:
counting a number of chunk data in one of the $1^{st}$ through $n^{th}$ swaths of data;
determining that the loss has occurred in the one of the $1^{st}$ through $n^{th}$ swaths of data of the satellite image data when the counted number of chunk data in the one of the $1^{st}$ through $n^{th}$ swaths of data is smaller than the predetermined number of the one of the $1^{st}$ through $n^{th}$ swaths of data.

11. The satellite image loss determination method of claim 9, wherein the determining of whether the loss has occurred in the satellite image data comprises:
determining the planned angle of the scan mirror at a time point where the flag value of the packet data is a first value;
determining the observed angle of the scan mirror at the time point based on the angle data received along with the flag value; and
determining that a loss has occurred in a start position of the satellite image data when a difference between the planned angle of the scan mirror and the observed angle of the scan mirror at the time point where the flag value is the first value is equal to or greater than a predetermined value.

12. The satellite image loss determination method of claim 9, wherein the determining of whether the loss has occurred in the satellite image comprises:
   determining the planned angle of the scan mirror at a time point where the flag value of the packet data is a second value;
   determining the observed angle of the scan mirror at the time point based on the angle data received along with the flag value; and
   determining that a loss has occurred in an end position of the satellite image data when a difference between the planned angle of the scan mirror and the observed angle of the scan mirror at the time point where the flag value is the second value is equal to or greater than a predetermined value.

13. The satellite image loss determination method of claim 8, further comprising: outputting an alarm when it is determined that the loss has occurred in the satellite image data.

14. The satellite image loss determination method of claim 8, further comprising: interpolating the satellite image data in which the loss has occurred.

15. A non-transitory computer-readable storage medium having stored thereon a program, which when executed by a computer, performs the satellite image loss determination method defined in claim 1.

\* \* \* \* \*